United States Patent
Schuster et al.

(10) Patent No.: US 11,695,362 B2
(45) Date of Patent: Jul. 4, 2023

(54) METHOD FOR MONITORING THE OPERATION OF AN ELECTRIC MOTOR, AND LIFTING MECHANISM

(71) Applicant: SEW-EURODRIVE GMBH & CO. KG, Bruchsal (DE)

(72) Inventors: Thomas Schuster, Ottenbach (DE); Robert Becker, Odenheim (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 172 days.

(21) Appl. No.: 17/284,638

(22) PCT Filed: Sep. 12, 2019

(86) PCT No.: PCT/EP2019/025306
§ 371 (c)(1),
(2) Date: Apr. 12, 2021

(87) PCT Pub. No.: WO2020/074116
PCT Pub. Date: Apr. 16, 2020

(65) Prior Publication Data
US 2021/0399666 A1 Dec. 23, 2021

(30) Foreign Application Priority Data
Oct. 12, 2018 (DE) .......................... 102018008070.7

(51) Int. Cl.
*H02P 27/06* (2006.01)
*H02P 23/14* (2006.01)
(Continued)

(52) U.S. Cl.
CPC .............. *H02P 23/14* (2013.01); *B66C 13/26* (2013.01); *B66D 5/30* (2013.01); *H02P 27/06* (2013.01)

(58) Field of Classification Search
CPC .......... H02P 27/06; H02P 23/14; B66C 13/26; B66D 5/30; B66B 1/32
See application file for complete search history.

(56) References Cited

U.S. PATENT DOCUMENTS 5,027,049 A * 6/1991 Pratt ....................... H02P 27/06
318/807
5,077,508 A * 12/1991 Wycoff ..................... B66B 1/32
187/292

FOREIGN PATENT DOCUMENTS

DE         4228798 C2     7/1998
DE       19713471 A1    9/1998
(Continued)

OTHER PUBLICATIONS

International Search Report issued in corresponding International Application No. PCT/EP2019/025306, dated Jan. 3, 2020, pp. 1-2, English Translation.

*Primary Examiner* — Cortez M Cook
(74) *Attorney, Agent, or Firm* — Carter, Deluca & Farrell LLP

(57) ABSTRACT

In a method for monitoring the operation of an electric motor and a lifting mechanism, the motor current is acquired, and the electric motor has, for example, an electromagnetically actuable brake, e.g., a holding brake. In the method, a pre-magnetization is performed when the electric motor is switched on, the characteristic of the acquired values of the motor current is monitored for an exceeding of a permissible measure of deviation from a setpoint characteristic, and a brake of the electric motor is activated, e.g., remains applied.

16 Claims, 2 Drawing Sheets

(51) Int. Cl.
*B66C 13/26* (2006.01)
*B66D 5/30* (2006.01)

(56) References Cited

FOREIGN PATENT DOCUMENTS

| | | |
|---|---|---|
| DE | 102018002188 A1 | 10/2018 |
| JP | 2007137621 A | 6/2007 |
| WO | 2011116488 A1 | 9/2011 |

* cited by examiner

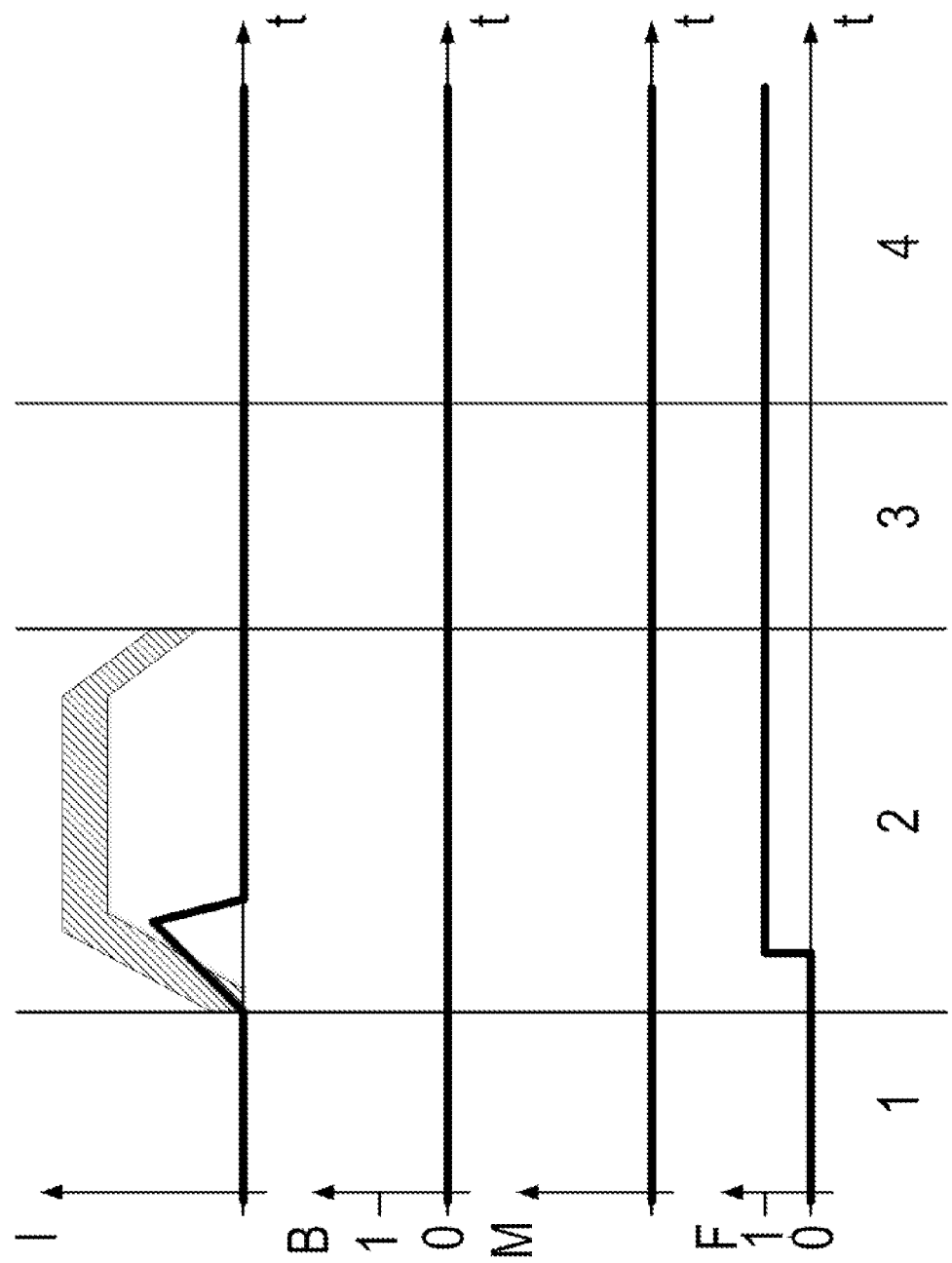

METHOD FOR MONITORING THE OPERATION OF AN ELECTRIC MOTOR, AND LIFTING MECHANISM

FIELD OF THE INVENTION

The present invention relates to a method for monitoring the operation of an electric motor, and to a lifting mechanism.

BACKGROUND INFORMATION

Certain conventional lifting mechanisms, such as a lift, can be driven by a drive, which—should it fail—may cause the lifted load to be dropped.

German Patent Document No. 10 2018 002 188, in particular, its paragraph [0035], describes a method for checking a drive. In the process, resistances of the stator winding of an electric motor are determined by measuring the motor voltage and the motor current; however, after the motor voltage has been applied, there is a waiting period for the motor current that comes about in a steady-state state so that the effects of the stator inductivity are negligible.

German Patent Document No. 42 28 798 describes a device for training the error search on electrical machines.

SUMMARY

Example embodiments of the present invention provide a method for monitoring the operation of a lifting mechanism in which the safety is improved, especially during the first start-up.

According to an example embodiment of the present invention, in a method for monitoring the operation of an electric motor, e.g., an electric motor arranged as an asynchronous motor, the motor current is acquired, the electric motor has, for example, an electromagnetically operable brake, e.g., a holding brake, and the brake torque generated by the brake is conveyed to the rotor of the electric motor, for example. When the electric motor is switched on, a pre-magnetization is performed, and, for example, during this pre-magnetization, the characteristic of the acquired values of the motor current is monitored for an exceeding of a permissible measure of deviation from a setpoint characteristic, and a brake of the electric motor is activated, e.g., remains applied.

This provides the advantage of greater safety because the motor is already able to be checked during the pre-magnetization, that is to say, while the brake is still closed and the rotor is not yet fully magnetized. If the motor current deviates too much from the predefined characteristic, then an error has occurred. For example, a ruptured cable, i.e., for example, a separated electrical line, or a missing connection or a missing electrical contact exists. However, it is also possible that a wiring error has occurred such as a faulty interconnection of the three-phase motor. For example, a star connection instead of a delta connection has been implemented. The electric motor would then not generate the desired torque in an active operation.

If such an error has occurred, the brake remains applied. In other words, the brake will not be released in order to establish the active operation. In the same manner, the active operation, i.e., an rpm-controlled or torque-controlled operation of the electric motor, will not take place.

The safety is therefore increased at the initial start-up.

Because the motor current characteristic is monitored as an initial step, that is to say, during the pre-magnetization, the checking, e.g., the monitoring, of the motor is possible within a very short period of time. Thus, there is no wait until the steady-state motor current values have been reached.

According to example embodiments, in a subsequent step, a brake of the electric motor is released if no exceeding has been detected, and the active operation, e.g., the controlled operation, of the electric motor then takes place, and the brake of the electric motor remains applied if an exceeding was detected, and no active operation, e.g., the controlled operation, of the electric motor takes place subsequently.

This provides the advantage that in a permissible current characteristic, no error has occurred, and the brake is therefore released following the pre-magnetization and the active operation is started.

According to example embodiments, the monitoring for an exceeding of the permissible measure of deviation is performed by monitoring the characteristic of the values of the acquired motor current for an exceeding of the time-dependent setpoint characteristic of an upper threshold value and for an undershooting of the time-dependent setpoint characteristic of a lower threshold value. This has the advantage that the measured value of the motor current acquired at a respective instant only needs to be compared with the upper threshold value allocated to this respective instant and be compared with the lower threshold allocated to this respective instant. The monitoring is therefore able to be performed by a simple comparison, and the safety is enhanced.

According to example embodiments, the stator of the electric motor is able to be supplied with a three-phase voltage by an inverter, and the rotor has a squirrel cage. This provides the advantage that an asynchronous motor supplied by an inverter is able to be used.

According to example embodiments, in a first time segment, the setpoint characteristic linearly rises with time, in a second time segment following the first time segment, the setpoint characteristic has constant values, and in a third time segment following the second time segment, the setpoint characteristic linearly drops with time down to a non-vanishing value.

This is considered advantageous insofar as a predefined setpoint characteristic is maintained. For example, a local maximum of motor current is achieved and thus the most rapid pre-magnetization possible. After the local maximum has been exceeded, the motor current must therefore be reduced again. In other words, even if losses are briefly greater, a rapid pre-magnetization is able to be performed. The linear segments of the setpoint characteristics allow for an especially uncomplicated monitoring.

According to example embodiments, the time period of the second time segment is shorter than the sum of the time period of the first time segment and the time period of the third time segment. This has the advantage that the rise in the first time segment can be implemented very rapidly, the current rise especially being limited only by the stator inductivity, and the drop in the motor current in the third time segment is likewise rapidly implementable because a non-vanishing value of motor current must be reached. Thus, a high value is able to be applied by the constant value which is located close to a permissible current limit and thus leads to a rapid pre-magnetization. It is important in this context that the motor current does have a constant value in the second time segment, i.e., that the amount of the motor current space vector formed from the phase currents of the electric motor is constant, but the direction of the motor current space vector need not necessarily be constant. This is because a modification of the direction of the motor current space vector in a simultaneously vanishingly low torque generation allows for a particularly rapid pre-magnetization and for a smooth connection of the motor to the driven cable drum during or following the release of the brake.

According to example embodiments, the difference between the upper and the lower threshold value increases monotonically in the first time segment and has a constant value in the second and third time segment. This is considered advantageous insofar as, depending on a possibly still existing residual magnetization at the start of the pre-magnetization, the buildup of the motor current with a higher deviation is tolerated, i.e., different starting conditions are taken into account, and after the maximum current provided during the pre-magnetization has been reached, the starting conditions become irrelevant.

According to example embodiments, an error is indicated and/or relayed when the permissible measure is exceeded. This has the advantage that the error state is recognizable and service measures, etc., are able to be initiated.

According to example embodiments, the electric motor generates a non-vanishing torque during an active operation, and the torque generated by the motor is controlled to a setpoint value, for example. This is considered advantageous insofar as a rotor flux is present after the implemented pre-magnetization, which makes it possible to generate a corresponding torque given a motor current space vector that is not aligned in parallel therewith. A direct supply of a large torque for the active operation is therefore able to be provided.

According to an example embodiment of the present invention, in a lifting mechanism for performing the previously mentioned method, the lifting mechanism has a load which is movable, e.g., liftable, by an electric motor fed by an inverter. The electric motor, for example, drives a cable drum onto which a cable with a fastened load is at least partly wound, and the electric motor is arranged as an asynchronous motor. The lifting mechanism has a device for acquiring the motor current, and the electric motor has a brake, e.g., an electromagnetically operable brake, e.g., a holding brake, the brake torque generated by the brake, for example, being conveyed to the rotor of the electric motor. The lifting mechanism, e.g., in particular the inverter, has a device for monitoring the acquired current for an exceeding of a permissible measure of deviation from a setpoint value, e.g., a setpoint value characteristic, and the device is connected to a display device for the display of an error in terms of signaling technology. This has the advantage that a dropped load is avoidable because the brake is released only when the pre-magnetization is provided in a reliable manner.

According to example embodiments, a gear unit is interconnected between the cable drum and the electric motor. This provides the advantage that the load can be provided hooked onto a rope, which can be wound around a cable drum which is able to be driven by the output shaft of the gear unit because the cable drum is connected to the output shaft in a torsionally fixed manner, and the input shaft of the gear unit is able to be driven by the rotor, e.g., by the rotor shaft of the electric motor, e.g., because the input shaft is connectable to the rotor in a torsionally fixed manner.

Further features and aspects of example embodiments of the present invention are described in greater detail below with reference to the appended schematic Figures.

BRIEF DESCRIPTION OF THE DRAWINGS

FIG. 2 illustrates a characteristic of the motor current of the electric motor in which the current characteristic exceeds a permissible measure of deviation from a predefined characteristic, or in other words, an error state is reached.

DETAILED DESCRIPTION

Figure 1:
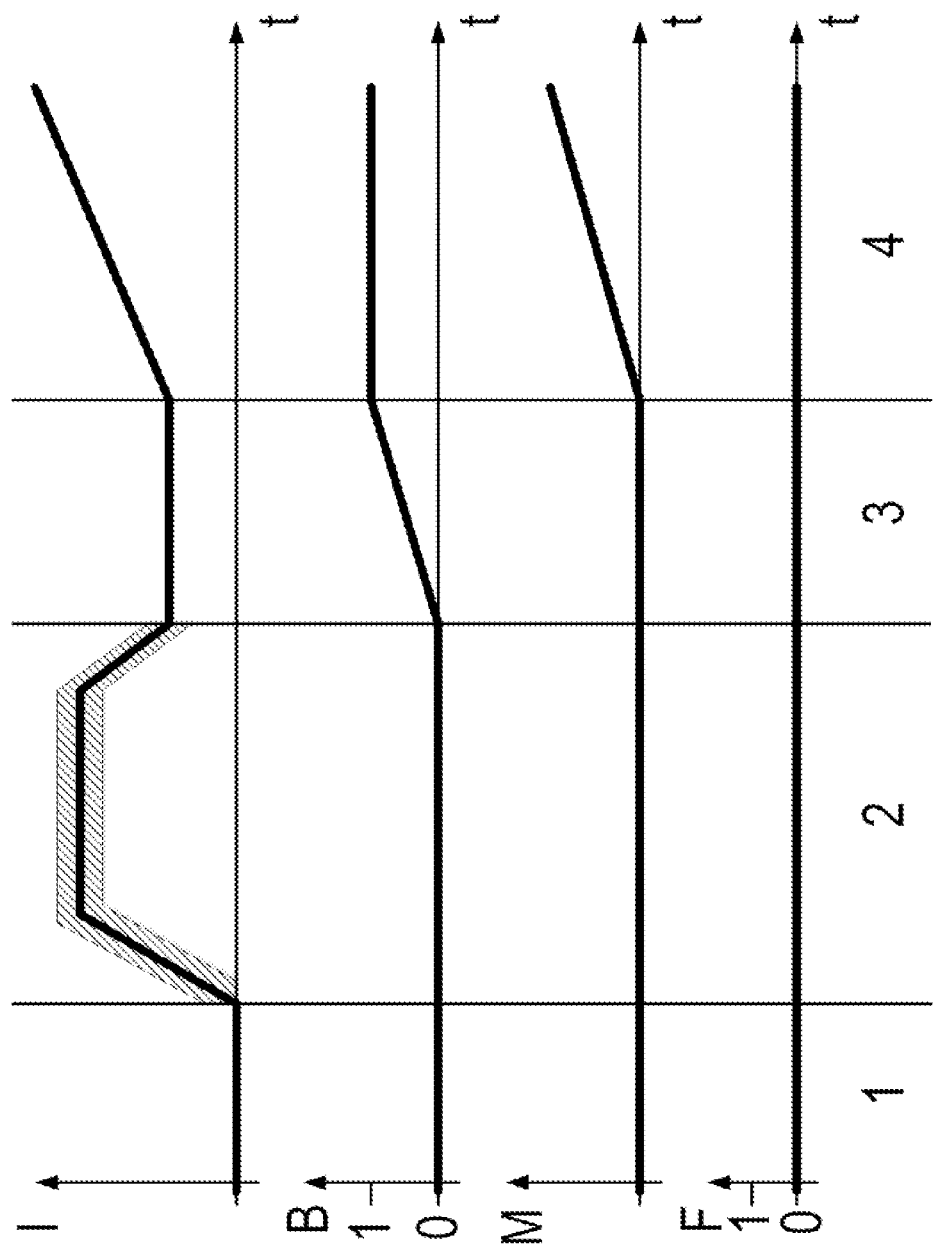
FIG. 1 illustrates a characteristic of a motor current of an electric motor in which the current characteristic does not exceed a permissible measure of deviation from a predefined characteristic, or in other words, no error state is reached.

As schematically illustrated in the Figures, when switching on an electric motor, i.e., following time segment 1 of a non-energization of the electric motor arranged as an asynchronous motor, the squirrel cage of the rotor of the electric motor is pre-magnetized to begin with.

An inverter supplies an alternating voltage such that a current which generates a magnetic field is flowing in the squirrel cage.

Because of the inductances, e.g., of the stator winding, the buildup of a magnetic field of the desired strength takes between a millisecond and ten seconds depending on the electric motor.

The motor is arranged as a three-phase motor, and the inverter supplies the motor with a three-phase voltage.

In a lifting mechanism, the rotor is connected to a cable drum in a torsionally fixed manner, and a load is attached to the cable that may be wound onto the cable drum.

To lift the load, torque M generated by the electric motor must exceed a minimum torque because the load may otherwise drop.

The acquisition of the motor current is accomplished with the aid of shunt resistors, which are placed in the supply lines from the inverter to the stator of the electric motor or alternatively with the aid of a shunt resistor which is situated on the DC-current-side terminal of the inverter. The inverter is able to be fed from a mains-supplied rectifier whose DC-voltage-side terminal is connected to the DC-voltage-side terminal of the inverter, e.g., via the shunt resistor.

The electric motor has an electromagnetically operable brake, which is arranged as a holding brake. The rotor is connected to an externally toothed part in a torsionally fixed manner or has an external tooth system of its own. Via its internal tooth system, a brake pad carrier is slipped onto the external tooth system of the rotor or the part and thus is situated on the rotor in a torsionally fixed but axially displaceable manner.

An energizable coil is connected to the stator in a torsionally fixed manner. An armature disk made of ferromagnetic steel is connected to the stator between the coil and the brake pad carrier in a torsionally fixed but axially movable manner. Bolts, which are connected to the stator, e.g., to the stator housing, guide the axial movement.

A spring element supported on the magnetic body of the coil presses the armature disk onto the brake pad carrier, which in turn is pressed against a brake surface arranged on the housing of the motor when the coil is not energized. Thus, the brake is then applied, which is represented in the Figures by the value 0 of state B of the brake.

When the coil is energized, the coil attracts the armature disk counter to the spring force generated by the spring element. As a result, the brake pad carrier then has axial play and the brake is released, which is indicated in the Figures by value 1 of state B of the brake.

The coil is not energized until pre-magnetization 2 has been concluded.

As illustrated in FIG. 1, the coil is energized following pre-magnetization 2, i.e., the brake is released. This release takes place in a time span 3 which is followed by active operation 4 of the motor, which thus means that a brake torque M is built up. The load is then secured against being dropped even when the brake is released.

However, if a wiring error exists or an error during the production of the windings of the motor or some other error relating to the wiring such as a cable rupture, a short-circuit or a faulty wiring type such as a star connection instead of a delta connection, the electric motor would not generate the desired torque in an active operation As illustrated in FIG. 2, an error state is triggered if an error is detected, i.e., when a permissible current value range is exceeded or alternatively, when the permissible current value range is undershot, so that the release of the brake scheduled to take place next is prevented and the active operation not started. In such a case, the load is therefore held with the aid of the brake.

The current value range is predefined by a characteristic of the upper threshold value and a characteristic of the lower threshold value, e.g., in the time segment of pre-magnetization 2.

As schematically illustrated in the Figures, the characteristic of the upper threshold value initially rises, i.e., in a first time segment, e.g., as a linear function of time, or in other words, proportionally with the time, and subsequently reaches a value that is constant for a further time segment, and it drops in a third time segment as a linear function of time to a non-vanishing value.

As schematically illustrated in the Figures, the characteristic of the lower threshold value likewise rises initially, i.e., in a first time segment, e.g., as a linear function of time, that is to say, proportionally with the time, and then reaches a value that is constant for a further time segment, and it drops in a third time segment as a linear function of time to a non-vanishing value. However, the lower threshold value always remains smaller than the upper threshold value and always has a minimum distance from it.

In further exemplary embodiments, the cable drum is not rotated directly by the rotor of the electric motor but via an interposed gear unit.

LIST OF REFERENCE CHARACTERS 1 non-energized electric motor
2 pre-magnetization
3 release of the brake
4 active operation of the motor
I motor current
B brake state
M torque
F error state

The invention claimed is:

1. A method for monitoring an operation of an electric motor including an electromagnetically operable brake adapted to generate brake torque and convey the brake torque to a rotor of the electric motor, comprising:
   acquiring a motor current; and
   in an initial step, when the electric motor is switched on, a characteristic of acquired values of the motor current induced during a pre-magnetization is monitored for an exceeding of a permissible measure of deviation from a setpoint characteristic, and the brake of the electric motor is correspondingly activated.

2. The method according to claim 1, wherein the electric motor is arranged as an asynchronous motor.

3. The method according to claim 1, wherein the characteristic of the acquired values of the motor current induced during the pre-magnetization is monitored when a motor voltage is applied.

4. The method according to claim 1, wherein the brake remains applied when activated.

5. The method according to claim 1, wherein, after the initial step:
   the brake of the electric motor is released if no exceeding is detected during the initial step, and an active operation and/or a controlled operation of the electric motor is thereafter performed; and
   the brake of the electric motor remains applied if an exceeding is detected during the initial step, and no active operation and/or controlled operation of the electric motor is subsequently performed.

6. The method according to claim 1, wherein the monitoring for the exceeding of the permissible measure of the deviation includes monitoring the characteristic of the values of the acquired motor current for an exceeding of a time-dependent setpoint characteristic of an upper threshold value and for an undershooting of the time-dependent setpoint characteristic of a lower threshold value.

7. The method according to claim 1, wherein a stator of the electric motor is adapted to be supplied with a three-phase voltage by an inverter, and the rotor includes a squirrel cage.

8. The method according to claim 6, wherein:
   in a first time segment of the initial step, the setpoint characteristic linearly rises with time;
   in a second time segment of the initial step following the first time segment, the setpoint characteristic has constant values; and
   in a third time segment of the initial step following the second time segment, the setpoint characteristic linearly drops with time to a non-vanishing value.

9. The method according to claim 8, wherein a difference between the upper threshold value and the lower threshold value increases monotonically in the first time segment and has constant value in the second and third time segment.

10. The method according to claim 8, wherein a time period of the second time segment is shorter than a sum of a time period of the first time segment and a time period of the third time segment.

11. The method according to claim 1, wherein an error is indicated and/or relayed when the permissible measure is exceeded.

12. The method according to claim 1, wherein a non-vanishing torque is generated by the electric motor during an active operation, and the torque generated by the motor is controlled to a setpoint value.

13. The method according to claim 1, wherein the motor and/or the rotor of the motor is not yet fully magnetized during the initial step.

14. A lifting mechanism adapted to perform the method as recited in claim 13, comprising:
   a load that is movable and/or liftable by an electric motor fed by an inverter, the electric motor adapted to drive a cable drum on which a cable with a fastened load is at least partly wound, the electric motor being arranged as an asynchronous motor, the lifting mechanism including a current acquisition device adapted to acquire a motor current, the electric motor including a brake adapted to generate brake torque and to convey the brake torque to a rotor of the electric motor;
   wherein the lifting mechanism and/or the inverter includes a monitor device adapted to monitor the acquired current for an exceeding of a permissible measure of deviation from a setpoint value and/or a setpoint value characteristic, the monitor device being connected to a display device adapted to display of an error in terms of signaling technology.

15. The lifting mechanism according to claim 14, wherein the brake is arranged as an electromagnetically operable brake and/or a holding brake.

16. The lifting mechanism according to claim 14, wherein a gear unit is interconnected between the cable drum and the electric motor.

\* \* \* \* \*